March 28, 1944.   A. LYSHOLM   2,344,993
INTERNAL COMBUSTION ENGINE
Filed Feb. 15, 1941   2 Sheets-Sheet 1
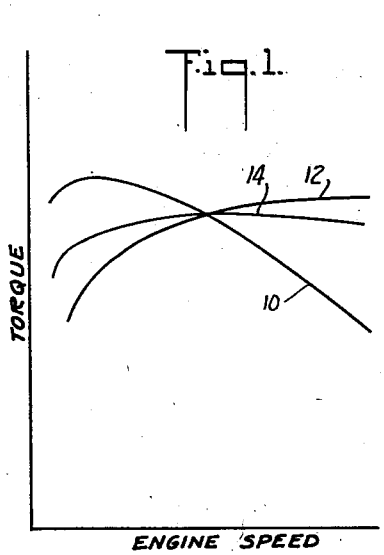
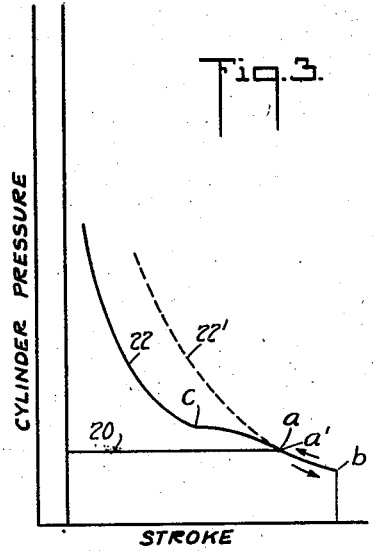
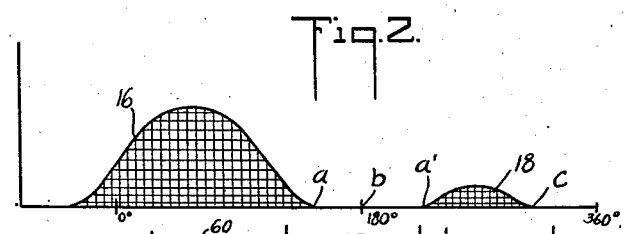
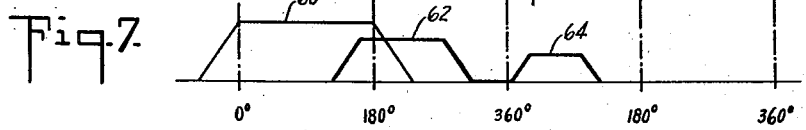
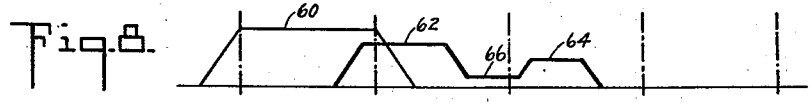
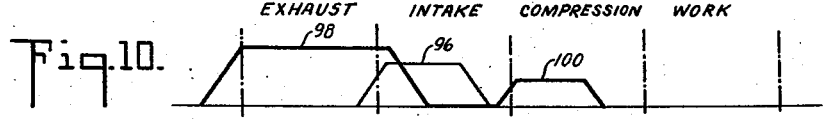
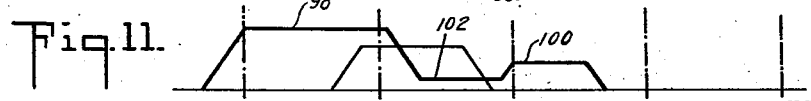
INVENTOR
Alf Lysholm
BY
ATTORNEY March 28, 1944.    A. LYSHOLM    2,344,993
INTERNAL COMBUSTION ENGINE
Filed Feb. 15, 1941    2 Sheets-Sheet 2

INVENTOR
Alf Lysholm
BY
ATTORNEY

Patented Mar. 28, 1944

2,344,993

UNITED STATES PATENT OFFICE 2,344,993

INTERNAL COMBUSTION ENGINE

Alf Lysholm, Stockholm, Sweden

Application February 15, 1941, Serial No. 379,011
In Germany January 3, 1939

16 Claims. (Cl. 123—105)

This application is a continuation-in-part replacing in part my co-pending application Serial No. 312,281, filed January 3, 1940, and relates back thereto as to common subject matter for all dates and rights incident to the filing of said application Serial No. 312,281, and foreign applications corresponding thereto.

The present invention relates to internal combustion engines and has particular reference to internal combustion engines operated with what may conveniently be termed partial charging of the engine cylinders, that is, operated in accordance with a cycle which contemplates that the effective compression ratio is less than the effective expansion ratio.

It has heretofore been proposed to operate internal combustion engines with a partial charging cycle, the partial charging being effected either by closing the inlet valve or valves ahead of the end of the suction stroke, or by delaying the closure of the cylinder valves so that either the inlet or exhaust valve or both are open during a substantial portion of the compression stroke and effective cylinder compression is not commenced until the piston has already travelled a substantial distance on this stroke.

If substantial advantage is to be taken of the potential possibilities of the partial charging cycle, the partial charge trapped in the engine cylinder for final compression therein must be of materially less initial volume than the volumetric capacity of the cylinder and this requires in connection with either of the above noted ways of effecting partial charging, that the valve be closed in the neighborhood of mid-stroke of the piston either on the admission stroke, in the case of partial charging by the method which inducts less than a full charge into the cylinder, or during the compression stroke by the method which effects partial charging by inducting the maximum possible cylinder charge and rejecting a portion of the inducted charge.

I have discovered that either of the above methods of operation results in unsatisfactory characteristics of volumetric efficiency and torque in a variable speed engine as compared with the volumetric efficiency and torque characteristics of engines having normal or conventional valve timing.

In the case of an engine timed to produce partial charging by restricting the amount of charge inducted into the cylinder, the volumetric efficiency and torque characteristics may be satisfactory at low speeds, but fall off to an unsatisfactory extent at high engine speeds. The reason for this appears to be due to the fact that at the time when admission of the charge is cut off, the piston is travelling at high velocity and the charge is passing through the admission valve or valves at high speed. Under the high velocity conditions obtaining, the resistance to flow of the charge through the valve varies much more with variation in engine speed, and the consequent variation in piston speed, than in the case of a conventionally timed engine when the charge admission is cut off with the piston at or near bottom dead center where the piston velocity is relatively low and subject to less variation in absolute speed with variation in engine speed.

In the case of partial charging effected by inducting the maximum possible charge into the cylinder and then rejecting a portion of the inducted charge during the compression stroke, charging must be terminated relatively late in the compression stroke. The reason for this is that a substantial portion of the inducted charge must be rejected and if normal sized valves are used, the resistance to flow through the valves is such that unless they are closed late in the stroke, too much of the inducted charge will remain in the cylinder at high engine speeds. In other words, the resistance at high engine speeds to the rejection of the desired portion of the charge will result in having too high a volumetric efficiency at high speeds unless the valve closing is relatively late in the stroke. In contrast with a conventional cycle in which it is desired to charge the cylinder as fully as possible, the volumetric efficiency with a partial charging cycle can be too high, resulting in raising the compression pressure above the normal desired maximum and causing pre-ignition or detonation.

With the valve or valves closing late in the compression stroke to avoid too high volumetric efficiency at high engine speeds, the volumetric efficiency drops off rapidly at low engine speeds since at low engine speeds the resistance to flow of the portion of the charge being rejected is relatively low and a larger portion than is desired of the previously inducted charge can escape from the cylinder through the late closing valve or valves.

It is thus apparent that where partial charging is effected either by early closing of the induction valve or by inducting the maximum possible cylinder charge and rejecting a portion of the inducted charge through a late closing valve, unsatisfactory volumetric efficiency and torque characteristics are obtained at either high engine speeds or low engine speeds, respectively.

In accordance with the principles of the present invention, the deficiencies incurred with partial charging as heretofore proposed are avoided and satisfactory volumetric efficiency and torque characteristics are obtained by so controlling the induction of the charge that closing of the valve or valves is effected during the induction stroke under conditions productive of lower velocities of air travel through the valve than with either of the methods described above.

Before proceeding with a detailed description of how such principles are applied, there are certain inherent characteristics of any reciprocating engine so as to charge induction which require explanation in order that the reader may more fully and readily understand certain of the important factors affecting the present invention. In any reciprocating engine having valves of normal or practicable size, there is resistance of such magnitude to flow of an incoming charge that as the engine speed increases, the amount of the charge that can be inducted, even when the inlet valve is held open past bottom dead center, is less than the amount corresponding to the full displacement of the cylinder. The higher the speed of operation of a given engine, the greater the disparity between the maximum charge that can actually be inducted and the maximum theoretical charge. Consequently, there is in any engine which seeks to induct a full charge an effective volumetric capacity of the cylinder which when considered over the entire speed range of the engine will be materially less than the theoretical maximum capacity. Ordinarily, the variation between the theoretical capacity and the effective capacity will be substantially immaterial at idling speed and will increase to a very material value at maximum speed.

In view of the existence of the above condition with a conventional engine, it is obvious that since the present invention contemplates, among other things, the deliberate partial starving of the cylinder on the induction stroke, such partial starving must be considered with reference to the maximum charging that can be obtained, rather than to the theoretical 100% charge that is never actually obtained. Also, since the invention is concerned primarily with making useful the partial charging cycle in variable speed engines, it follows that its principles must necessarily be carried out in the normal working speed range of the engine, in which what may be termed the "mean" speed, that is, the speed midway between idling speed and maximum speed, is not only included but may also conveniently be utilized as representative of the working speed range.

By charging the cylinder in the above described fashion, the induction valve may be closed at a later place in the induction stroke than would be the case if the induction valve were closed at a place determinative of the final charge. Consequently, the induction valve is closed at a time when the piston is nearer bottom dead center and travelling at a lower speed for a given engine speed. From this it follows that the volumetric efficiency is relatively less affected by change in engine speed since under the conditions obtaining there is less change in absolute piston speed with change in engine speed.

On the compression stroke a portion of the inducted charge must be rejected but since with the method of the present invention the excess amount of charge in the cylinder which must be rejected is substantially smaller than if the cylinder had been charged to effective capacity during the induction stroke, the rejection of the excess quantity can be effected with the cylinder being closed at an earlier time in the compression stroke than would otherwise be the case, without obtaining too high a volumetric efficiency at high engine speeds. With the earlier final closing of the cylinder on the compression stroke, the net charge retained in the cylinder is larger at low engine speeds than with late closing and consequently the volumetric efficiency at low engine speeds is relatively higher than with the very late closing. For this reason the volumetric efficiency characteristic is not so sensitive to variations in speed as is the case where the maximum possible charge is first inducted into the cylinder.

By inducting a charge less than that corresponding to the effective volumetric capacity of the cylinder during the induction stroke, such change in volumetric efficiency as does occur with change in engine speed produces a variation reducing volumetric efficiency as engine speed increases and increasing volumetric efficiency as engine speed decreases. By rejecting a portion of the charge during the compression stroke, such change in volumetric efficiency as does occur during this stroke with change in engine speed operates to increase volumetric efficiency as engine speed increases and to decrease volumetric efficiency as engine speed decreases. Thus, there are during the charging portion of the cycle two variations in volumetric efficiency with change in engine speed, these variations however operating in opposed relation. With this opposed relationship the net variation in volumetric efficiency with change in engine speed can be reduced to a degree productive of a relatively constant volumetric efficiency factor if that is desired. It is not in all cases desirable to have such a characteristic and it is believed it will be apparent that with the opposed variations in this factor which occur during the suction and compression strokes when the charge is controlled in accordance with the present invention, desired net volumetric efficiency characteristics can be obtained by suitably relating the valve timing during the suction stroke to the valve timing during the compression stroke so as to make the valve closure during one or the other of these strokes the dominant factor.

This control of volumetric characteristic obtainable with the present invention may perhaps be more clearly understood from the following examples. Let it first be assumed that the most nearly flat efficiency curve is desired and that the volume of the working charge to be compressed in the cylinder at mean engine speed is to be fifty percent of the effective volumetric capacity of the cylinder. If it is further assumed for the purpose of the present example that resistances through the valve openings are equal, then the timing would be such that induction would be terminated during the suction stroke at such speed with the cylinder charged to three-quarters of its effective capacity and the excess over the volume of the desired net working charge, amounting to 25% of the effective cylinder capacity, would be rejected during the compression stroke. With this timing a balance is effected between the valve closing during the suction and compression strokes such that the valve closing on neither of these strokes has a predominant effect.

Now let us assume that it is desired to provide an engine having a volumetric efficiency curve rising with increase in engine speed. This characteristic can be obtained by inducting a larger percentage of the effective capacity of the cylinder during the suction stroke and rejecting the increased amount of excess over the desired final net charge during the compression stroke. Thus, for example, if 85% rather than 75% of the effective capacity of the cylinder is inducted during the suction stroke, the valve operating to cut off induction will close later in the piston stroke and with the piston travelling at lower speed for a given engine speed than in the previously given example. If a charge corresponding to 85% of the effective cylinder capacity is charge inducted, this requires that 35% of the charge be rejected if the desired net final charge of 50% of the net cylinder volume is to be obtained. This in turn means that the valve which is opened during the compression stroke must be held open to a later time in the stroke before it is closed in order to reject the 35% of excess charge previously inducted. Due to closure of the valve relatively later in the compression stroke, the effect of the valve closing on volumetric efficiency with change in engine speed is increased as compared with the previous example and this effect is to tend to increase volumetric efficiency as engine speed increases.

From the above it is believed it will be evident that if the opposite effect is desired, that is, a falling volumetric efficiency with increase in engine speed, this can be obtained by valve timing which will, for example, induct only 60% of the effective capacity of the cylinder during the suction stroke and reject only 10% during the compression stroke.

From the foregoing discussion it will be apparent that the general object of the present invention is to provide improved method and means for partially charging an internal combustion engine so as to secure the benefits of the improved efficiency and fuel economy obtainable with the partial charging cycle of operation, while at the same time providing characteristics of volumetric efficiency and torque which will give satisfactory engine operation over a wide speed range.

For a better understanding of the manner in which the above general object and other and more detailed objects of the invention are attained, reference may best be had to the ensuing portion of this specification, taken in conjunction with the accompanying drawings, in which suitable examples of apparatus for carrying the invention into effect are described by way of example but without limitation.

In the drawings:

Fig. 1 is a diagram showing engine torque plotted against speed;

Fig. 2 is a valve timing diagram showing a valve opening plotted against crank travel;

Fig. 3 is an indicator diagram showing cylinder suction and compression pressures;

Fig. 7 is a diagram showing inlet and exhaust valve timing plotted against crank travel;

Fig. 8 is a diagram similar to Fig. 7, showing a variation of the timing illustrated in Fig. 7;

Fig. 10 is a diagram similar to Fig. 7, showing a different valve timing arrangement embodying the invention; and Fig. 11 is a diagram similar to Fig. 10 showing a variation of the timing embodied in Fig. 10.

Figure 4:
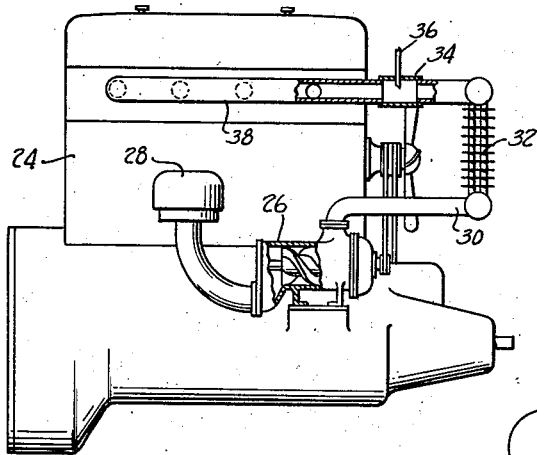
Fig. 4 is a more or less diagrammatic elevation of an engine embodying the invention.

Referring now to the drawings, Fig. 1 illustrates by curve 10 the torque characteristics of a partially charged engine in which the partial charging is effected by stopping the induction of the charge prior to the end of the suction stroke. Curve 12 illustrates the torque characteristics of an engine operated with partial charging effected by charging the cylinder to its effective volumetric capacity during its suction stroke and rejecting a part of the inducted charge during the first part of the compression stroke.

As will be observed from these curves, the torque characteristic, which is a function of volumetric efficiency, has in each case the unsatisfactory nature previously described.

Curve 14 on the other hand illustrates a torque characteristic obtainable with an engine embodying the present invention, this characteristic being relatively flat over a wide range of engine speeds.

As previously explained, the desirable torque characteristic represented by curve 14 is obtained in accordance with the present invention by both restricting the charge inducted during the induction stroke to an amount less than the effective volumetric capacity of the cylinder and rejecting a portion of the partial charge so inducted during the compression stroke.

This general mode of operation, in so far as charge induction and rejection is concerned, is generally illustrated in Fig. 2 wherein the abscissa represent crank travel and the ordinates represent valve opening.

In this diagram zero degrees crank travel represents top dead center at the commencement of the intake stroke and the curve 16 indicates an intake valve timing in accordance with the principles of the invention, this timing being such that the valve opens ahead of top dead center prior to the ending of the preceding exhaust stroke and closes prior to the end of the intake stroke. Thereafter, during the ensuing compression stroke the valve timing is such that a valve, which for the purposes of the present discussion may be assumed to be the inlet valve, is opened as indicated by curve 18 so that a part of the inducted charge is rejected from the cylinder.

Referring to Fig. 3, the diagram thereof shows a typical indicator diagram for the suction and compression strokes of an engine embodying the principles of the invention. As will be observed from this diagram, the charge is admitted to the cylinder during the first portion of the suction stroke at substantially constant pressure as indicated by line 20. At point $a$, corresponding to point $a$ in the diagram of Fig. 2, induction of the charge is stopped and the inducted charge, expanded in the cylinder down to point $b$ at the end of the suction stroke of the piston, corresponding to point $b$ of Fig. 2. During the early part of the ensuing compression stroke the inducted charge is recompressed to point $a'$ which coincides with point $a$ on the diagram of Fig. 3 and which correspond to the point $a'$ on the diagram of Fig. 2.

At point $a'$ on the compression stroke, rejection of a part of the inducted charge is effected through the opening of a cylinder valve and the compression pressure follows the line $a'$—$c$, point c corresponding to point c in the diagram of Fig. 2. From point c the compression pressure rises along the line 22.

The nature of the compression curve obtained with this arrangement in comparison with what may be termed a normal compression stroke in which the cylinder is continuously closed from the beginning to the end of the compression period is evident from the relation of the compression as above described to the compression which would be obtained along line 22' if the cylinder compressed the charge from point b without rejection of any part of the charge during the compression stroke.

The underlying principles of the invention, which involve both a sufficiently restricted induction to partially starve the cylinder and a subsequent rejection of a part of the inducted charge may be carried out with numerous different valve timing arrangements and with different types of engines as, for example, both carburetor engines and injection engines. Also, the invention is particularly applicable and is in fact primarily useful with supercharged engines to which the charge is delivered, at least during operation in the upper portion of the load range, at superatmospheric pressure.

Figure 5:
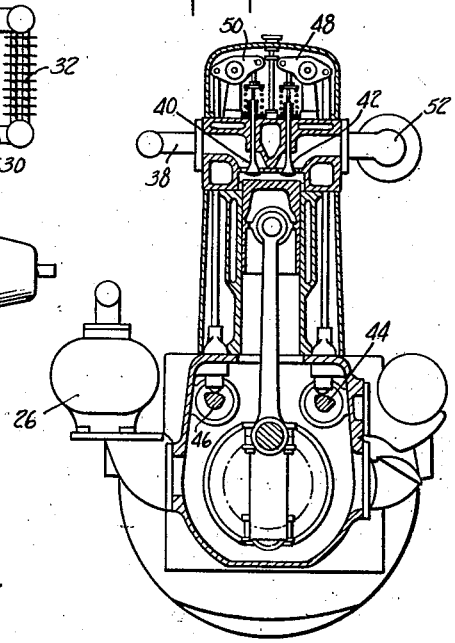
Fig. 5 is a cross-section of the engine shown in Fig. 4.

Referring now more particularly to Figs. 4 and 5, there is illustrated more or less diagrammatically a supercharged carbureter engine to which the invention is applied. In these figures the engine is indicated generally at 24 and is provided with a suitable engine driven supercharging compressor 26 which is advantageously of the rotary displacement type. Air is drawn into the supercharger through the inlet 28 and is delivered through the discharge conduit 30, preferably through an intercooler 32 to the inlet of a pressure carbureter diagrammatically indicated at 34 and having a fuel inlet at 36. The outlet of the carbureter 34 is connected to the usual intake manifold 38 from which it is distributed to the several engine cylinders. As shown in Fig. 5, the engine is of the four-cycle type provided with overhead inlet and exhaust valves 40 and 42, respectively, operated in the usual manner from cam shafts 44 and 46 and overhead rockers 48 and 50. The exhaust valves 42 deliver to the usual exhaust manifold 52.

With this form and type of engine the principles of the invention are advantageously and simply carried out by providing for a double lift for the inlet valve of each cylinder so that the inlet valve opens fully for a restricted portion of the intake stroke, closes and again opens to a certain extent during the ensuing compression stroke. This valve timing may readily be secured by making the inlet valve cams with profiles of the character shown in Fig. 6. As shown in this figure, the cam 54 has a profile providing a main cam lift 56 and a secondary or auxiliary cam lift 58. The cam lift 56 provides for the valve opening during the suction stroke corresponding to the lift indicated by line 16 of Fig. 2 and the auxiliary cam lift 58 provides for the valve opening during the compression stroke corresponding to the lift indicated by line 18 of Fig. 2.

With this arrangement, the portion of the inducted charge which is rejected from the engine cylinder is returned to the intake manifold, and it will be evident that with a carbureter engine, charge rejection through the inlet valve is to be preferred since if any part of the charge is rejected through an open exhaust valve, the portion rejected will represent a loss of fuel.

In Fig. 7 a valve lift diagram corresponding to the above described arrangement is illustrated, the line 60 representing the lift of the exhaust valve and the lines 62 and 64 representing the main and auxiliary lifts of the inlet valve.

In some instances it may be desirable to not completely close the inlet valve between the termination of the induction period during the suction stroke and the rejection period during the compression stroke. A valve timing arrangement embodying this principle is shown in Fig. 8 which as to the timing of the valves is like that shown in Fig. 7 except for the fact that, as indicated by line 66, the inlet valve is allowed to remain partially open between the lifts indicated by lines 62 and 64. If the inlet valve is not fully closed between the principal induction period and the rejection period, the valve opening as represented by line 66 should be very small, giving a highly throttled condition which will not materially affect the line a—b of Fig. 2. Permitting the inlet valve to remain open along line 66 is of advantage primarily from practical considerations, relieving the valve of one closing impact against its seat during each cycle of operation.

Figure 9:
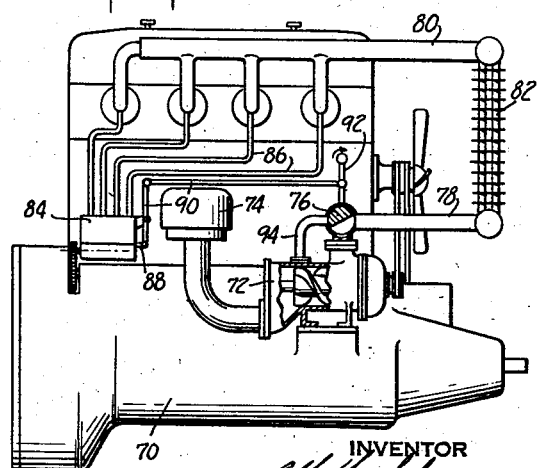
Fig. 9 is a more or less diagrammatic elevation of an injection engine embodying the invention.

In Fig. 9 there is shown diagrammatically a supercharged injection engine embodying the invention. In this figure the engine is indicated generally at 70 and is, like the engine described in Fig. 4, equipped with an engine driven supercharging compressor 72 having an air inlet at 74 and discharging through a control valve 76 and conduit 78 to an air inlet manifold 80. Preferably, an inter-cooler 82 is interposed between the compressor outlet and the inlet manifold.

Fuel is supplied by an engine driven injection pump indicated at 84, which supplies fuel in known manner through the injection lines 86 to the several cylinders of the engine. Control of the amount of fuel injected is effected by means of a pump control member 88 in any desired known manner and the pump control member 88 is connected by means of the linkage indicated at 90 to a main control member 92 which is also connected to valve 76. The latter is connected by means of a by-pass conduit 94 to the inlet side of the supercharger and the linkage providing the interconnection betwen the valve and pump control is such that as the control 92 is moved to progressively decrease the amount of fuel injected, the by-pass 94 is progressively opened by the valve 76.

In so far as the mechanical structure of the engine itself and the valve arrangement is concerned, it may be assumed that the engine shown in Fig. 9 is similar to that shown in Figs. 4 and 5.

Figure 6:
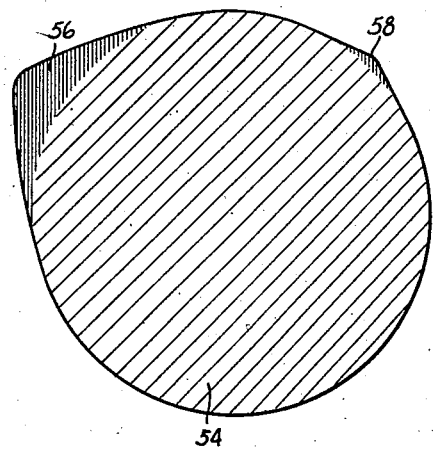
Fig. 6 is a section on enlarged scale showing one form of valve cam suitable for use in connection with the invention.

With the engine shown in Fig. 9, the charging of the cylinders may in accordance with the present invention be effected in the manner previously described in connection with Figs. 4 to 6. However, in the present instance, due to the fact that the charge inducted into the cylinder is air rather than a fuel mixture and the fuel is not supplied to the cylinder until relatively late in the compression stroke or even after the end of the compression stroke, other valve timing arrangements may advantageously be used to get the desired character of charge induction. Thus, with this form of engine it is possible without incurring loss of fuel to effect the desired rejection of a portion of the charge through the exhaust valve rather than through the inlet valve and also the valve timing during the suction stroke may be varied to provide substantial overlap of opening of the inlet and exhaust valves during this stroke for scavenging purposes. Regardless of the specific nature and extent of scavenging which is effected, rejection of the part of the charge which is finally rejected during the compression stroke may advantageously be effected by opening the exhaust valve since the rejection of a part of the charge through this valve will further aid in cooling the valve.

In Fig. 10 an arrangement in which the partial charge is obtained through use of a double lift for the exhaust valve is illustrated. In the diagram of this figure the line 96 indicates the inlet valve lift, from which it will be noted that the inlet valve is closed at a much earlier point in the cycle than in accordance with conventional practice, the latter usually involving closure of the inlet valve anywhere from 25° to 40° from bottom dead center on the compression stroke. Line 98 indicates the usual exhaust valve timing during the exhaust stroke and as will be observed provides for the usual scavenging overlap effected by opening the inlet valve before the exhaust valve is closed. Line 100 indicates the reopening of the exhaust valve during the compression stroke to effect the desired rejection of a portion of the inducted charge. The opening and reopening of the exhaust valve during the cycle may evidently be readily accomplished by means of a double lift cam of the character described in connection with Fig. 6.

As in the case of charge rejection through the inlet valve, it may also in some instances be advantageous to keep the exhaust valve slightly open between its main opening period, indicated by line 98 and its auxiliary opening period, indicated by line 100. This character of exhaust valve timing is illustrated in Fig. 11 wherein the line 102 indicates the exhaust valve remaining unseated but in a throttling position during the interim between its main opening period and its auxiliary opening period. As in the case of an inlet valve operated in this manner, this arrangement eliminates one valve impact against its seat per cycle of operation and further provides an additional cooling effect due to the continued flow of relatively cool charge past the hot exhaust valve.

It will be understood that in cases where the invention is applied to injection engines, the timing of the charge rejection during the compression stroke, in relation to the timing of the fuel injection period, is such that the charge rejection is completed prior to the injection of fuel so that a properly determined and controlled ratio of fuel to air may be maintained and further so that none of the injected fuel is lost from the cylinder due to rejection of any part of the charge.

In the foregoing discussion of the principles of the invention specific degrees of valve timing have not been touched upon since it will be apparent to those skilled in the art that the exact timing of the valves in order to produce any desired engine characteristic will be influenced among other things by the relative sizes of valve openings to cylinder capacity and many other design factors which will influence the resistance to flow of gases to and from the cylinder. These factors, however, are all readily calculable to determine exact timing. In the examples hereinbefore discussed poppet type valves have been illustrated by way of example, but it will be apparent that the invention is equally applicable to slide valve types of engines in which induction is effected through valve ports. It will further be readily apparent that a special valve in addition to the ordinary valves may be utilized for effecting rejection but the advantages to be gained by such an arrangement ordinarily do not warrant the added complication.

It is also to be noted that the specific timing of the valves in order to secure the desired result will be affected also by the efficiency characteristics of the compressor in the case of a supercharged engine. Ordinarily, even with displacement type compressors the efficiency of the compressor tends to fall off at low speeds and such change in efficiency should be compensated for in the valve timing.

While the type of engine and the character of its intended duty will influence the desired percentage of the effective cylinder capacity to be inducted at any given speed and the relation to the total cylinder capacity of the amount of the charge retained for final compression, I have found that for a medium speed automotive type of engine, satisfactory results are obtained by restricting the charge inducted to about 80% of the effective volumetric capacity of the cylinder and rejecting approximately 20% of the inducted charge, so as to thereby retain a final charge for compression which amounts to approximately 60% of the effective capacity of the cylinder. With such a charge a compression ratio of approximately 6 to 1 may be employed with ordinary fuels and an expansion ratio of approximately 10 to 1 obtained.

Variation in the specific values of the above discussed factors, however, do not affect the general principles of the invention.

It will be obvious that the invention may be carried out in many different specific forms of engine and it will further be evident that many different specific variants of the method may be employed. The invention is consequently to be considered as embracing all forms of apparatus and variants of method falling within the scope of the appended claims.

What is claimed is:

1. The method of partially charging an internal combustion engine cylinder which includes charging the cylinder during the induction stroke to provide therein when the engine is operating at its mean speed a charge substantially less than that corresponding to the effective volumetric capacity of the cylinder at the same speed but greater than the desired final working charge to be compressed, rejecting from the cylinder during the compression stroke the portion of the inducted charge in excess of the desired working charge and finally compressing said working charge.

2. The method set forth in claim 1, in which the inducted charge is substantially greater than half of the effective volumetric capacity of the cylinder.

3. The method set forth in claim 1 in which the rejected portion of the inducted charge is rejected to the induction system which supplies the cylinder.

4. The method set forth in claim 1 in which the reduced value of the inducted charge is obtained by maintaining communication between the cylinder and its induction system during a portion only of the induction stroke and in which the desired rejection of a portion of the inducted charge is obtained by placing the cylinder in communication with said induction system during a portion of the compression stroke.

5. The method set forth in claim 1 in which the reduced value of the inducted charge is obtained by maintaining relatively unrestricted communication between the cylinder and its induction system during the early portion of the induction stroke and greatly restricting such communication during the latter portion of said stroke, and in which the desired rejection of a portion of the excess charge is obtained by mantaining the cylinder in said greatly restricted communication with said induction system during the first part of the compression stroke, thereafter opening up such communication for an ensuing portion of the compression stroke and closing such communication substantially in advance of the end of the compression stroke.

6. The method as set forth in claim 1 of charging an engine having an air charging induction system and an exhaust, in which the rejected portion of the air charge is rejected to the exhaust and in which fuel is injected into the unrejected portion of the air charge remaining for final compression therein.

7. The method as set forth in claim 1 in which the inducted charge is precompressed and cooled before induction into the cylinder and is inducted therein at superatmospheric pressure.

8. In an internal combustion engine, a cylinder having valves for controlling flow of gaseous fluid to and from the cylinder and timed engine driven means for opening and closing said valves, said means being timed to place the cylinder in communication with the induction system of the engine during the induction stroke so as to admit to the cylinder at mean engine speed a charge substantially less than the effective volumetric capacity of the cylinder at that speed and said means further being timed to open at least one of said valves during a portion of the compression stroke to reject from the cylinder a portion of the partial charge previously inducted, whereby to retain in the cylinder a final working charge less than the previously inducted partial charge.

9. In an internal combustion engine, a cylinder having an inlet valve and an exhaust valve, timed engine driven means for opening and closing said valves, said means being constructed and timed to cause said inlet valve to close prior to the end of the induction stroke and to again open during a portion of the compression stroke.

10. In an internal combustion engine, a cylinder having an inlet valve and an exhaust valve, timed engine driven means for operating said valves, said means being constructed and timed to cause said inlet valve to open substantially fully during the early part of the induction stroke and to substantially but not fully close during the latter part of the induction stroke, whereby to partially charge the cylinder at mean engine speed to substantially less than its effective volumetric capacity at that speed, and said means further being constructed and timed to maintain said inlet valve in its substantially but not fully closed position during the early portion of the compression stroke and to thereafter reopen said valve during a further portion of the compression stroke and finally close the valve prior to the end of the compression stroke, whereby to reject through said valve a portion of the inducted charge and retain in the cylinder a final working charge less than the inducted charge.

11. In an internal combustion engine, a cylinder having an inlet valve and an exhaust valve, timed engine driven means for opening and closing said valves, said means being constructed and timed to cause said inlet valve to permit at mean engine speed only a charge substantially less than the effective volumetric capacity of the cylinder to be inducted during the induction stroke and further being constructed and timed to permit a portion of the inducted charge to be rejected from the cylinder through said exhaust valve during the compression stroke.

12. In a supercharged internal combustion engine, a cylinder having an inlet valve and an exhaust valve, timed engine driven means for opening and closing said valves, said means being constructed and timed to cause both of said valves to be opened during the induction stroke, with the exhaust valve only partially open and with the inlet valve closing prior to the end of the induction stroke, whereby to induct a charge less than the effective volumetric capacity of the cylinder during the induction stroke, and said means further being constructed and timed to more fully open the exhaust valve during the compression stroke to reject through the exhaust valve a portion of the inducted charge.

13. In an internal combustion engine, a cylinder, an inlet valve for said cylinder, and an engine driven cam for operating said valve, said cam having a plurality of lifts thereon, said lifts being arranged and timed to cause the cam to open the valve during an early portion of the induction stroke and again during an early portion of the compression stroke.

14. In an internal combustion engine, a cylinder, an inlet valve for said cylinder, and an engine driven cam for operating said valve, said cam having a plurality of lifts thereon, said lifts being arranged and timed to cause the cam to open the valve during an early portion of the induction stroke and again during an early portion of the compression stroke, the cam lift operating to open the valve during the induction stroke providing a greater valve lift than the cam lift operating to open the valve during the compression stroke.

15. An internal combustion engine comprising a plurality of valve controlled cylinders, an engine driven supercharging compressor, a cooler for cooling air delivered by said compressor, an inlet manifold for conducting air from said cooler to the inlet valves of said cylinders, timed fuel injection means for injecting liquid fuel into said cylinders, valve actuating means for the cylinder valves, said actuating means being constructed and arranged to time the opening and closing of the valves to induct at mean engine speed an air charge into each of the cylinders less than the effective volumetric capacity thereof during its induction stroke and to reject a portion of the inducted air charge during the early portion of the compression stroke, said fuel injection means being timed to inject fuel into the respective cylinders after the rejection of air therefrom during the compression stroke has been completed, and means for varying the pressure at which air is delivered to said inlet manifold by said supercharger.

16. An internal combustion engine comprising a plurality of valve controlled cylinders, an engine driven supercharging compressor, a cooler for cooling air delivered by said compressor, an inlet manifold for conducting air from said cooler to the inlet valves of said cylinders, timed fuel injection means for injecting liquid fuel into said cylinders, valve actuating means for the cylinder valves, said actuating means being constructed and arranged to time the opening and closing of the valves to induct at mean engine speed an air charge into each of the cylinders less than the effective volumetric capacity thereof during its induction stroke and to reject a portion of the inducted air charge during the early portion of the compression stroke, said fuel injection means being timed to inject fuel into the respective cylinders after the rejection of air therefrom during the compression stroke has been completed, means for varying the pressure at which air is delivered to said inlet manifold by said supercharge, means for controlling the quantity of fuel injected to the respective cylinders, and control means interconnecting the two last mentioned means and arranged to cause the pressure to be reduced as the fuel quantity is reduced, and vice versa.

ALF LYSHOLM.